United States Patent
Zheng et al.

(10) Patent No.: US 12,404,158 B2
(45) Date of Patent: Sep. 2, 2025

(54) LOCAL MAP UPDATING METHOD AND APPARATUS, AND ELECTRONIC DEVICE

(71) Applicant: VisionNav Robotics USA Inc., Acworth, GA (US)

(72) Inventors: Fan Zheng, Shenzhen (CN); Cheng Zhang, Shenzhen (CN); Yujie Lu, Shenzhen (CN); Feng Zhang, Shenzhen (CN); Jiang Liu, Shenzhen (CN)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/042,556

(22) Filed: Jan. 31, 2025

(65) Prior Publication Data

US 2025/0250151 A1    Aug. 7, 2025

(30) Foreign Application Priority Data

Feb. 7, 2024   (CN) .......................... 202410174186.6

(51) Int. Cl.
*B66F 9/075* (2006.01)
*B66F 9/06* (2006.01)
*G01S 17/89* (2020.01)

(52) U.S. Cl.
CPC ............ *B66F 9/0755* (2013.01); *B66F 9/063* (2013.01); *G01S 17/89* (2013.01)

(58) Field of Classification Search
CPC ......... B66F 9/0755; B66F 9/063; G01S 17/89
See application file for complete search history.

(56) References Cited

U.S. PATENT DOCUMENTS

| | | |
|---|---|---|
| 2021/0323572 A1 | 10/2021 | He et al. |
| 2023/0042968 A1 | 2/2023 | Ding et al. |
| 2023/0186494 A1 | 6/2023 | Carsten et al. |

(Continued)

FOREIGN PATENT DOCUMENTS

| | | |
|---|---|---|
| CN | 108732584 A | 11/2018 |
| CN | 111735451 A | 10/2020 |
| CN | 112258618 A | 1/2021 |

(Continued)

OTHER PUBLICATIONS

CN117055089 Translation (Year: 2023).*

(Continued)

*Primary Examiner* — Russell Frejd
(74) *Attorney, Agent, or Firm* — Getech Law LLC; Jun Ye (57) ABSTRACT

Embodiments of the present application disclose a local map updating method and apparatus, and an electronic device, including: acquiring key-frame point cloud data, where the key-frame point cloud data includes point cloud coordinate points; matching the key-frame point cloud data with a prior map to determine target voxels, in the prior map, corresponding to the point cloud coordinate points; and updating a point cloud probability distribution corresponding to each target voxel according to a first map coordinate point and a second map coordinate point included in each target voxel to obtain a target map, where the first map coordinate point is obtained by converting the point cloud coordinate point corresponding to the target voxel, and the second map coordinate point is a coordinate point included in the target voxel in the prior map.

20 Claims, 4 Drawing Sheets

(56) References Cited

U.S. PATENT DOCUMENTS

2024/0427966 A1* 12/2024 Pandita ................ G05B 17/02

FOREIGN PATENT DOCUMENTS

| | | | |
|---|---|---|---|
| CN | 113192197 | A | 7/2021 |
| CN | 114064680 | A | 2/2022 |
| CN | 115700507 | * | 2/2023 |
| CN | 116596750 | A | 8/2023 |
| CN | 117055089 | * | 11/2023 |
| CN | 117519164 | * | 2/2024 |
| CN | 116678423 | * | 4/2024 |
| KR | 102371852 | B1 | 3/2022 |
| KR | 20220050507 | A | 4/2022 |
| WO | 2018221455 | A1 | 12/2018 |

OTHER PUBLICATIONS

CN115700507 Translation (Year: 2023).*
CN117519164 Translation (Year: 2024).*
CN116678423 Translation (Year: 2024).*
CN 202410174186.6, First Office Action, mailed Mar. 30, 2024, 30 pages. (with English translation).
CN 202410174186.6, Second Office Action, mailed Apr. 12, 2024, 11 pages. (with English translation).
CN 202410174186.6, Notice of Allowance, mailed Apr. 21, 2024, 9 pages. (with English translation).

* cited by examiner

LOCAL MAP UPDATING METHOD AND APPARATUS, AND ELECTRONIC DEVICE

CROSS REFERENCE TO RELATED APPLICATIONS

The present application claims priority to Chinese patent application No. 202410174186.6, filed with the China National Intellectual Property Administration on Feb. 7, 2024, entitled "Local Map Updating Method and Apparatus, and Electronic Device", which is hereby incorporated by reference in its entirety.

TECHNICAL FIELD

The present application relates to the field of positioning technologies, and in particular, to a local map updating method and apparatus, and an electronic device.

BACKGROUND

At present, in a positioning process of an electronic device, a pre-constructed prior map is usually used as a basis for determining a device pose of the electronic device, but in an actual environment in which the electronic device is located, variable objects are often presented, resulting in inconsistency between an environment detected by the electronic device in real-time and the prior map, and a larger environment change leads to lower accuracy of the device pose determined by using the prior map. Therefore, dynamic updating is performed by the electronic device on the map of the environment in which the electronic device is located, but a map updating manner at present is quite costly in computing resources, and is in a low efficiency. Therefore, how to improve map updating efficiency remains to be addressed.

SUMMARY

Embodiments of the present application disclose a local map updating method and apparatus, and an electronic device, to reduce consumption of computing resources for map updating as well as improve map updating efficiency.

An embodiment of the present application discloses a local map updating method, including: acquiring key-frame point cloud data, where the key-frame point cloud data includes point cloud coordinate points; matching the key-frame point cloud data with a prior map to determine target voxels, in the prior map, corresponding to the point cloud coordinate points; where the prior map includes voxels and a point cloud probability distribution corresponding to each of the voxels; each of the target voxels includes a first map coordinate point and a second map coordinate point, where the first map coordinate point is obtained by converting the point cloud coordinate point corresponding to the target voxel, and the second map coordinate point is a coordinate point included in the target voxel in the prior map; computing a first probability distribution parameter value corresponding to a first target voxel according to the first map coordinate point included in the first target voxel, where the first target voxel is any one of the target voxels; fusing the first probability distribution parameter value with a second probability distribution parameter value included in the point cloud probability distribution corresponding to the first target voxel, to obtain a target probability distribution parameter value, where the second probability distribution parameter value is obtained based on the second map coordinate point included in the first target voxel; and updating the point cloud probability distribution corresponding to the first target voxel according to the target probability distribution parameter value.

An embodiment of the present application discloses an electronic device, including: a memory storing an executable program code; and a processor coupled to the memory; where the processor calls the executable program code stored in the memory to perform: acquiring key-frame point cloud data, where the key-frame point cloud data includes point cloud coordinate points; matching the key-frame point cloud data with a prior map to determine target voxels, in the prior map, corresponding to the point cloud coordinate points; where the prior map includes voxels and a point cloud probability distribution corresponding to each of the voxels; each of the target voxels includes a first map coordinate point and a second map coordinate point, where the first map coordinate point is obtained by converting the point cloud coordinate point corresponding to the target voxel, and the second map coordinate point is a coordinate point included in the target voxel in the prior map; computing a first probability distribution parameter value corresponding to a first target voxel according to the first map coordinate point included in the first target voxel, where the first target voxel is any one of the target voxels; fusing the first probability distribution parameter value with a second probability distribution parameter value included in the point cloud probability distribution corresponding to the first target voxel, to obtain a target probability distribution parameter value, where the second probability distribution parameter value is obtained based on the second map coordinate point included in the first target voxel; and updating the point cloud probability distribution corresponding to the first target voxel according to the target probability distribution parameter value.

An embodiment of the present application discloses a computer-readable storage medium storing a computer program, where when the computer program is executed by a processor, the processor is caused to perform the method according to any one of the above embodiments.

An embodiment of this application discloses a computer program product, including a computer program, where when the computer program is executed by a processor, steps of any one of the above methods are implemented.

According to the local map updating method and apparatus, and the electronic device disclosed in the embodiments of the present application, the key-frame point cloud data including the point cloud coordinate points is obtained, the key-frame point cloud data is matched with the prior map, to determine the target voxels corresponding to the point cloud coordinate points from the voxels included in the prior map, each target voxel may include a first map coordinate point and a second map coordinate point, the first map coordinate point is obtained by converting the point cloud coordinate point corresponding to the target voxel, and the second map coordinate point is a coordinate point included in the target voxel in the prior map, and then the point cloud probability distribution corresponding to each target voxel is updated according to the first map coordinate point and the second map coordinate point included in each target voxel, to obtain the target map. When the embodiment is implemented, the key-frame point cloud data is acquired, the to-be-updated target voxels, in the prior map, corresponding to the point cloud coordinate points included in the key-frame point cloud data are determined, and then the point cloud probability distribution corresponding to each target voxel is updated according to the first map coordinate point and the second map coordinate point that correspond to each target voxel, so that the prior map is locally updated without global updating of the prior map, consumption of computing resources for map updating is reduced, and map updating efficiency is improved. Furthermore, since the updating is performed based on the prior map, the fixed features of the prior map can be retained, avoiding the fixed features of the prior map from being incorrectly covered, improving the accuracy of the map updating, making the target image match the changing environment more closely, and the device pose is determined by the target map, which can also improve the accuracy of the determined device pose.

BRIEF DESCRIPTION OF DRAWINGS

To describe the technical solutions in the embodiments of the present application more clearly, the following briefly describes the accompanying drawings used in the embodiments, apparently, the accompanying drawings in the following description are merely some embodiments of the present application, and a person of ordinary skill in the art may further obtain other accompanying drawings based on these accompanying drawings without making creative efforts.

DETAILED DESCRIPTION

The following clearly describes the technical solutions in the embodiments of the present application with reference to the accompanying drawings in the embodiments of the present application. All other embodiments obtained by those of ordinary skills in the art based on the embodiments of the present application without making creative efforts shall fall within the protection scope of the present application.

It should be noted that the terms "include" and "comprise" in the embodiments of the present application and any variations thereof are intended to cover non-exclusive inclusion, for example, a process, method, system, product, or device that includes a series of steps or units is not necessarily limited to those steps or units that are clearly listed, but may include other steps or units that are not clearly listed or that are inherent to these processes, methods, products, or devices.

It will be understood that the terms "first," "second," etc., as used herein may be used to describe various elements, but these elements are not limited by these terms. These terms are only used to distinguish one element from another. For example, without departing from the scope of the present application, a "first map coordinate point" may be referred to as a "second map coordinate point", and similarly, the "second map coordinate point" may be referred to as the "first map coordinate point". The first map coordinate point and the second map coordinate point are both map coordinate points, but they are not the same map coordinate point.

In related arts, unmanned forklift technology is widely used in industrial logistics scenarios, such as factories, warehouses, industrial parks, etc. An unmanned forklift is required to have a capability of precise positioning in an industrial logistics scenario, and in an existing positioning method, the unmanned forklift realizes precise positioning based on a prior map, where the prior map refers to a map constructed according to an operating environment of the unmanned forklift. The unmanned forklift can achieve precise positioning by matching the real-time measurement result of the sensor with the prior map. The sensor may refer to a 3D laser sensor, and compared with a camera, the 3D laser sensor has higher measurement accuracy, and therefore is widely used in the field of precise positioning of unmanned forklifts.

In related positioning methods, an unmanned forklift registers a currently collected point cloud image with a prior map based on the prior map to determine a current pose of the unmanned forklift. The point cloud registration algorithm mainly includes a Normal Distribution Transform (NDT) algorithm and an Iterative Closest Point (ICP) algorithm. The ICP algorithm performs matching based on each point cloud coordinate point included in the point cloud image and each coordinate point included in the prior map to complete registration of the point cloud image and the prior map, a registration process of the ICP algorithm is to determine a transformation parameter value to minimize a sum of point cloud errors from all points in the transformed point cloud image to corresponding points/lines/planes in the prior map, and the point cloud error may be modeled as multiple errors such as a point-to-point error, a point-to-line error, and a point-to-plane error as required. The NDT algorithm divides the prior map into a plurality of voxels, and determines the point cloud probability distribution corresponding to each voxel, and the registration process of the NDT algorithm is to determine a transformation parameter value to minimize the sum of posterior errors of the transformed point cloud image in the plurality of voxels of the prior map, and the posterior errors are not described in detail, and may be set according to actual modeling situations.

However, there are often a large number of movable objects in the industrial logistics environment, such as transported goods, temporarily parked vehicles, etc., that is, the environment constantly changes, resulting in that the environmental features in the point cloud image collected when the unmanned forklift operates in real time are different from the environmental features in the pre-constructed prior map, resulting in errors in the registration of the point cloud image and the prior map, and reducing the accuracy of positioning. To resolve this problem, the prior map is usually dynamically updated in the related art, the electronic device may also synchronously update the prior map in a real-time positioning process, and use the updated prior map in a subsequent positioning process, but synchronously updating the prior map in the positioning process is consuming in computing resources, and continuous updating may cause incorrect coverage of fixed features of the prior map.

Embodiments of the present application disclose a local map updating method and apparatus, and an electronic device, to reduce consumption of computing resources for map updating as well as improve map updating efficiency.

The following describes in detail with reference to the accompanying drawings.

Figure 1:
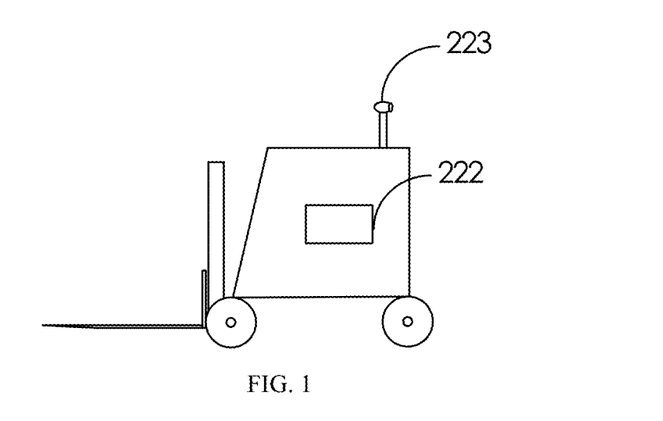
FIG. 1 is a schematic diagram of an application scenario of a local map updating method according to an embodiment of the present application.

As shown in FIG. 1, FIG. 1 is a schematic diagram of an application scenario of a local map updating method disclosed in an embodiment of the present application, the application scenario may include an electronic device 111, the electronic device 111 may include, but is not limited to, a control terminal, a vehicle-mounted terminal, and the like, applied to a vehicle such as an unmanned forklift, an intelligent vehicle, or a transport vehicle, and the electronic device 111 may also be an intelligent robot (such as a robot vacuum). Optionally, the electronic device 111 may also be a device in communication connection with a vehicle or an intelligent robot such as an unmanned forklift, an intelligent vehicle, a transportation vehicle, etc. The unmanned forklift is taken as an example, which can send collected data to the electronic device 111, and the electronic device 111 processes the data correspondingly.

The electronic device 111 or the vehicle equipped with the electronic device 111 may include a point cloud collection apparatus 112, and the point cloud collection apparatus 112 may be configured to collect point cloud images. The point cloud collection apparatus 112 may include, but is not limited to, a 3D laser sensor, a depth camera, and the like.

The electronic device 111 can store a prior map corresponding to a preset area in which the electronic device 111 is currently located, and when the electronic device 111 moves in the preset area, or the electronic device 111 controls the vehicle to move in the preset area, the electronic device 111 may obtain the point cloud image collected by the point cloud collection apparatus 112, to determine, based on the prior map and the point cloud image, a collection pose corresponding to the point cloud image, where the collection pose may be determined as a device pose of the electronic device 111 or a device pose of the vehicle carrying the electronic device 111. The point cloud image may include point cloud coordinate points, and each point cloud coordinate point is determined based on a point cloud coordinate system.

In an embodiment, in a process of locally updating the prior map, the electronic device 111 may acquire key-frame point cloud data, where the key-frame point cloud data includes point cloud coordinate points; the electronic device 111 matches the key-frame point cloud data with the prior map to determine target voxels corresponding to the point cloud coordinate points in the prior map, where the prior map includes voxels and a point cloud probability distribution corresponding to each voxel; and then the electronic device 111 updates the point cloud probability distribution corresponding to each target voxel based on a first map coordinate point and a second map coordinate point that are included in each target voxel, to obtain the target map, where the first map coordinate point is obtained by converting the point cloud coordinate point corresponding to the target voxel, and the second map coordinate point is a coordinate point included in the target voxel in the prior map.

Figure 2:
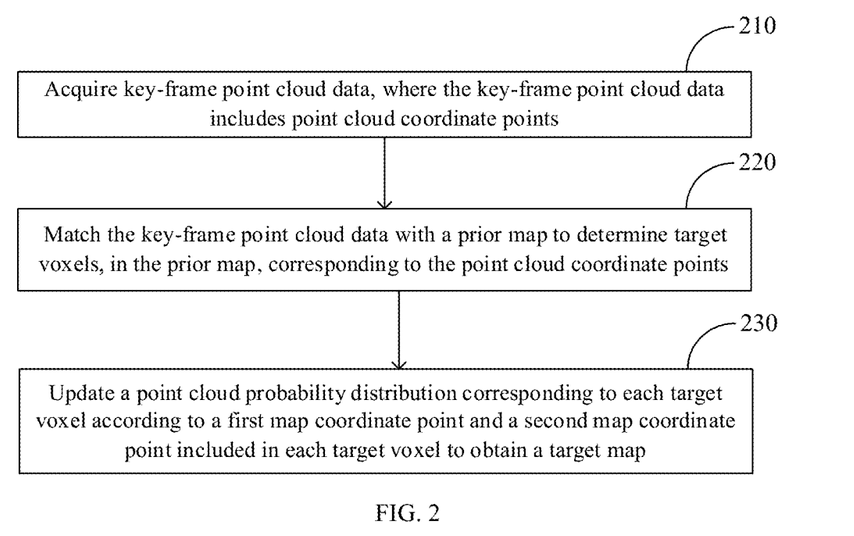
FIG. 2 is a schematic flowchart of a local map updating method according to an embodiment of the present application.

As shown in FIG. 2, FIG. 2 is a schematic flowchart of a local map updating method according to an embodiment of the present application, the local map update method may be applied to the electronic device in the above embodiment, and the local map updating method may include the following steps:

Step 210, acquiring key-frame point cloud data, where the key-frame point cloud data includes point cloud coordinate points.

When the electronic device moves in a preset area, or the electronic device controls a vehicle to move in the preset area, as an environment in the preset area may change, for example, the warehouse may include transported goods and temporarily parked vehicles. In order to ensure positioning accuracy of the electronic device, the collection pose of the electronic device may change during the movement of the electronic device, so the collection pose may be determined and the prior map may be updated by using the point cloud image acquired by the point cloud collection apparatus, the collection pose may refer to a corresponding pose of the electronic device in a map coordinate system of the prior map, and changing of the collection pose of the electronic device may include changing of a collection position of the electronic device and/or changing of a collection posture of the electronic device, the collection position may refer to a position determined by the electronic device relative to an origin of the map coordinate system of the prior map, and the collection posture may refer to a posture determined by the electronic device relative to coordinate directions of the map coordinate system of the prior map, for example, the collection posture may include an angle between a line connecting the position of the electronic device and the origin of the map coordinate system and each coordinate axis direction.

The electronic device may collect point cloud images by using the point cloud collection apparatus during movement, and perform point cloud registration on each point cloud image and the prior map, to determine a collection pose corresponding to each point cloud image based on a registration result. The electronic device may select, based on the collection pose corresponding to each point cloud image, key-frame point cloud images from the point cloud images to form key-frame point cloud data, where each key-frame point cloud image refers to a point cloud image that meets a map updating condition in the point cloud images, and a pose difference between collection poses corresponding to each key-frame point cloud image is relatively large, so that the map can be comprehensively updated. The key-frame point cloud data includes point cloud coordinate points, and the point cloud coordinate points included in the key-frame point cloud data may be point cloud coordinate points included in the key-frame point cloud images.

The electronic device may use point cloud images collected at intervals of a specific distance as the key-frame point cloud images during movement. The specific distance needs to be preset according to an actual situation, which not only needs to avoid too many key-frame point cloud images resulting in too many map updates and too much computing, but also needs to avoid that two adjacent key-frame point cloud images do not overlap due to insufficient key-frame point cloud images, resulting in reduction of the accuracy of map update. Optionally, the electronic device may determine, based on the collection pose of each frame of point cloud image, whether a specific distance is reached during movement, to determine whether to determine a currently collected point cloud image as a key-frame point cloud image.

Step 220, matching the key-frame point cloud data with a prior map to determine target voxels, in the prior map, corresponding to the point cloud coordinate points.

The prior map may be pre-constructed, and the prior map may include a plurality of voxels and point cloud probability distributions corresponding to the voxels. The electronic device may determine, based on a spatial range corresponding to the prior map, segmentation quantities respectively corresponding to each of three spatial dimensions, to obtain a plurality of voxels included in the prior map, where the number of the voxels may be obtained by multiplying segmentation quantities each corresponding to one of the three spatial dimensions, and the three spatial dimensions may include an x-axis, a y-axis, and a z-axis of a point cloud coordinate system. The electronic device determines, based on each coordinate point in the prior map, a voxel to which the each coordinate point belongs, and may correspondingly store the voxel and a coordinate point included in the voxel. The electronic device then determines, based on the coordinate points included in each voxel, a point cloud probability distribution corresponding to each voxel.

It may be understood that a spatial range corresponding to the prior map is usually greater than a spatial range corresponding to one or more frames of point cloud images collected by the electronic device, and the electronic device may determine a target spatial range corresponding to the key-frame point cloud data in the prior map, to update the target spatial range by using the key-frame point cloud data. Optionally, the prior map may include a plurality of voxels, each voxel corresponds to a spatial range, and the electronic device may determine, from the plurality of voxels included in the prior map, target voxels corresponding to the point cloud coordinate points included in the key-frame point cloud data.

Step 230, updating a point cloud probability distribution corresponding to each target voxel according to a first map coordinate point and a second map coordinate point included in each target voxel to obtain a target map.

The first map coordinate point is obtained by converting the point cloud coordinate point corresponding to the target voxel, and the second map coordinate point is a coordinate point included in the target voxel in the prior map. It should be noted that the point cloud coordinate point is a point determined based on a point cloud coordinate system, the first map coordinate point and the second map coordinate point are points based on a map coordinate system, the map coordinate system may be a world coordinate system, and the embodiment of the present application does not limit an origin and a coordinate system direction of the map coordinate system. The point cloud coordinate system may be determined according to a collection pose of the electronic device, the collection pose may include a collection position and a collection posture, and the collection position and the collection posture may also be determined as a device pose of the electronic device or a vehicle carrying the electronic device. Optionally, an origin of the point cloud coordinate system may be a collection position of the electronic device, and a coordinate axis direction of the point cloud coordinate system may be determined based on a collection posture of the electronic device.

The voxels included in the prior map may each correspond to a point cloud probability distribution, the point cloud probability distribution may be obtained by performing computing based on a plurality of second map coordinate points included in each voxel, the point cloud probability distribution may be used to represent a probability that one second map coordinate point exists at any position in a corresponding voxel, and point cloud probability distributions corresponding to the voxels included in the prior map may be computed in advance. The electronic device may update the point cloud probability distribution corresponding to each target voxel based on the first map coordinate point and the second map coordinate point that are included in each target voxel, to obtain a target map, where the target map may include voxels and an updated point cloud probability distribution corresponding to each voxel.

In the embodiments of the present application, the key-frame point cloud data including the point cloud coordinate points is obtained, the key-frame point cloud data is matched with the prior map, to determine the target voxels corresponding to the point cloud coordinate points from the voxels included in the prior map, each target voxel may include a first map coordinate point and a second map coordinate point, the first map coordinate point is obtained by converting the point cloud coordinate point corresponding to the target voxel, and the second map coordinate point is a coordinate point included in the target voxel in the prior map, and then the point cloud probability distribution corresponding to each target voxel is updated according to the first map coordinate point and the second map coordinate point included in each target voxel, to obtain the target map. When the embodiment is implemented, the key-frame point cloud data is acquired, the to-be-updated target voxels, in the prior map, corresponding to the point cloud coordinate points included in the key-frame point cloud data are determined, and then the point cloud probability distribution corresponding to each target voxel is updated according to the first map coordinate point and the second map coordinate point that correspond to each target voxel, so that the prior map is locally updated without global updating of the prior map, consumption of computing resources for map updating is reduced, and map updating efficiency is improved. Furthermore, since the updating is performed based on the prior map, the fixed features of the prior map can be retained, avoiding the fixed features of the prior map from being incorrectly covered, improving the accuracy of the map updating, making the target image match the changing environment more closely, and the device pose is determined by the target map, which can also improve the accuracy of the determined device pose.

In a specific example, the local map updating method disclosed in the embodiments of the present application may be applied to a positioning method of an unmanned forklift in a variable environment based on an incremental normal distribution transformation (iNDT) algorithm. According to the local map updating method in the embodiment of the present application, most voxels of the prior map may be fixedly maintained, and a small part of voxels of the prior map may be incrementally and dynamically loaded and unloaded, so that global positioning is performed by using fixed features of the prior map, and local precise positioning correction is performed by using features of the locally updated small part of voxels, thereby improving positioning accuracy of the unmanned forklift in the variable environment. In addition, the unmanned forklift can perform local map updating while positioning, and does not need to write an updated target map into a memory, such as a hard disk, thereby reducing input-output (IO) consumption of data to the memory and improving positioning efficiency.

Figure 3:
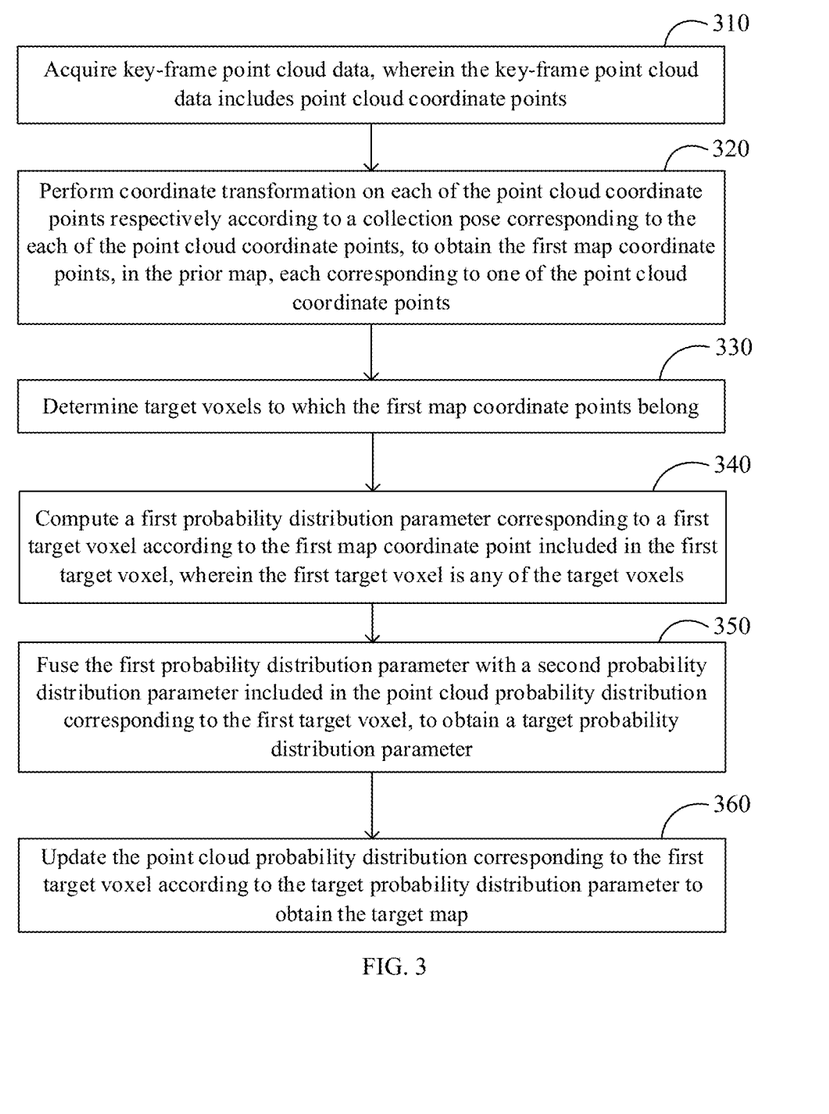
FIG. 3 is a schematic flowchart of another local map updating method according to an embodiment of the present application.

As shown in FIG. 3, FIG. 3 is a schematic flowchart of another local map updating method according to an embodiment of the present application, the local map update method may be applied to the electronic device in the above embodiment, and the local map updating method may include the following steps:

Step 310, acquiring key-frame point cloud data, where the key-frame point cloud data includes point cloud coordinate points.

Step 320, performing coordinate transformation on each of the point cloud coordinate points respectively according to a collection pose corresponding to the each of the point cloud coordinate points, to obtain the first map coordinate points, in the prior map, each corresponding to one of the point cloud coordinate points.

The collection pose of each point cloud coordinate point may be used to represent a conversion relationship between a point cloud coordinate system of the key-frame point cloud image corresponding to each point cloud coordinate point and a map coordinate system corresponding to the prior map, and the electronic device determines, based on the collection pose corresponding to each point cloud coordinate point, a conversion parameter value corresponding to each point cloud coordinate point, where the conversion parameter value may include a rotation vector and a translation vector, and it may be understood that both the point cloud coordinate system and the map coordinate system are three-dimensional coordinate systems, the rotation vector may include three rotation parameters, and the translation vector may include three translation parameters. In respect of mathematics, the conversion parameter value may be a 6-degree-of-freedom spatial transformation [R, t], where the rotation vector is a 3-degree-of-freedom rotation R, each degree-of-freedom of the rotation corresponds to a rotation parameter value, the rotation parameter value may be a 3×3 rotation matrix, the three rotation parameters may respectively correspond to rotation around an x-axis, rotation around a y-axis, and rotation around a z-axis, the translation vector may also be a 3-degree-of-freedom translation t, each degree-of-freedom translation corresponds to a translation parameter value, and the three translation parameters may respectively correspond to translation along an x-axis, translation along a y-axis, and translation along a z-axis.

The electronic device may perform coordinate conversion on each point cloud coordinate point respectively based on the conversion parameter value corresponding to each point cloud coordinate point, to obtain the first map coordinate point corresponding to each point cloud coordinate point in the prior map. The conversion parameter value may represent a conversion relationship from the point cloud coordinate system corresponding to the point cloud coordinate point to the map coordinate system, and the first map coordinate point in the prior map corresponding to each point cloud coordinate point may be a coordinate point of each point cloud coordinate point in the map coordinate system.

Optionally, the electronic device may perform rotation on each point cloud coordinate point according to the rotation vector included in the conversion parameter value corresponding to each point cloud coordinate point, and then perform translation on each rotated point cloud coordinate point according to the translation vector included in the conversion parameter value corresponding to each point cloud coordinate point, to obtain the first map coordinate point in the prior map corresponding to each point cloud coordinate point. Specifically, as shown in formula (1), formula (1) represents a calculation formula for converting each point cloud coordinate point into a first map coordinate point.

$$p' = Rp + t \quad \text{Formula (1)}$$

p represents the point cloud coordinate point, R represents the rotation vector, t represents the translation vector, and p' represents the first map coordinate point in the prior map corresponding to the point cloud coordinate point.

Step 330, determining target voxels to which the first map coordinate points belong.

In the process of pre-constructing the prior map, the electronic device may divide the spatial range corresponding to the prior map into voxels according to a preset division manner, and determine a spatial range corresponding to each voxel, and then the electronic device determines the point cloud probability distribution corresponding to each voxel, where the point cloud probability distribution corresponding to each voxel may be determined according to a probability distribution parameter value, and the electronic device may determine the probability distribution parameter value corresponding to each voxel according to a distribution type of each voxel, to obtain the point cloud probability distribution corresponding to each voxel. Optionally, the distribution type of the voxels included in the prior map may be Gaussian distribution, and the probability distribution parameter value corresponding to each voxel may include a coordinate average value and a covariance matrix.

The electronic device may determine, based on the spatial ranges corresponding to the voxels included in the prior map, a target voxel to which each first map coordinate point belongs as the target voxel corresponding to each point cloud coordinate point in the prior map. The electronic device may correspondingly store each target voxel and the corresponding point cloud coordinate point by using an association container, and the association container may include but is not limited to a data structure such as a hash table, an association array, or a graph, which is not limited.

Step 340, computing a first probability distribution parameter value corresponding to a first target voxel according to the first map coordinate point included in the first target voxel, where the first target voxel is any one of the target voxels.

In an embodiment, the distribution type corresponding to the first map coordinate points included in the first target voxel may also be Gaussian distribution, the first probability distribution parameter value may include a first coordinate average value and a first covariance matrix corresponding to the first map coordinate point included in the first target voxel, and the electronic device computes the first coordinate average value corresponding to the first target voxel based on the first map coordinate point included in the first target voxel, and then computes the first covariance matrix based on the first map coordinate point included in the first target voxel and the first coordinate average value. As shown in Formula (2) and (3), Formula (2) represents the computing process of the first coordinate average value, and Formula (3) represents the computing process of the first covariance matrix, $$\vec{\mu}_m = \frac{1}{m}\sum_{k=1}^{m} \vec{y}_k \quad \text{Formula (2)}$$

$$\Sigma_m = \frac{1}{m}\sum_{k=1}^{m} (\vec{y}_k - \vec{\mu}_m)(\vec{y}_k - \vec{\mu}_m)^T \quad \text{Formula (3)}$$

m represents the number of first map coordinate points included in the first target voxel, $\vec{y}_k$ represents the k-th first map coordinate point, $\vec{\mu}_m$ represents the first coordinate average value, and $\Sigma_m$ represents the first covariance matrix.

Step 350, fusing the first probability distribution parameter value with a second probability distribution parameter value included in the point cloud probability distribution corresponding to the first target voxel, to obtain a target probability distribution parameter value.

The second probability distribution parameter value is obtained based on a second map coordinate point included in the first target voxel, the second map coordinate point is a coordinate point included in the first target voxel in the prior map, a distribution type corresponding to the second map coordinate points included in the first target voxel may also be Gaussian distribution, and the second probability distribution parameter value may include a second coordinate average value corresponding to the second map coordinate point included in the first target voxel and a second covariance matrix. The electronic device may compute the second coordinate average value corresponding to the first target voxel according to the second map coordinate point included in the first target voxel, and then compute the second covariance matrix according to the second map coordinate point included in the first target voxel and the second coordinate average value.

In a process of fusing the first probability distribution parameter value and the second probability distribution parameter value, a first weight corresponding to the first probability distribution parameter value may be determined based on a number of first map coordinate points included in the first target voxel, and a second weight corresponding to the second probability distribution parameter value may be determined based on a number of second map coordinate points included in the first target voxel.

Optionally, the first weight may be a number of first map coordinate points included in the first target voxel, and the second weight may be a number of second map coordinate points included in the first target voxel. Optionally, the first weight may be a proportion of the first map coordinate point included in the first target voxel in all map coordinate points included in the first target voxel, and the second weight may be a proportion of the second map coordinate point included in the first target voxel in all map coordinate points included in the first target voxel.

In an embodiment, the electronic device may perform weighted average computing on the first coordinate average value and the second coordinate average value to obtain a target coordinate average value, the electronic device may offset the first covariance matrix based on the target coordinate average value and the first coordinate average value to obtain a first offset matrix, and offset the second covariance matrix based on the target coordinate average value and the second coordinate average value to obtain a second offset matrix, and then the electronic device performs weighted average computing on the first offset matrix and the second offset matrix to obtain the target covariance matrix.

In the process of computing the target coordinate average, the electronic device may multiply the first coordinate average value by the first weight to obtain a first weighted average value, and multiply the second coordinate average value by the second weight to obtain a second weighted average value, and then divide a sum of the first weighted average value and the second weighted average value by a sum of the first weight and the second weight to obtain the target coordinate average value. As shown in Formula (4), Formula (4) represents the computing process of the target coordinate average value, $$\vec{\mu} = \frac{m\vec{\mu}_m + n\vec{\mu}_n}{m+n};$$

Formula (4)

where n represents a number of second map coordinate points included in the first target voxel, $\vec{\mu}_n$ represents the second coordinate average value, and $\vec{\mu}$ represents the target coordinate average value.

In a computing process of the target covariance matrix, the electronic device may determine a first average value difference matrix according to the target coordinate average value corresponding to the first target voxel and the first coordinate average value, and then combine the first covariance matrix corresponding to the first target voxel with the first average value difference matrix, that is, offset the first covariance average value through the first average value difference matrix to obtain a first offset matrix corresponding to the first target voxel, and the electronic device may also determine a second average value difference matrix according to the target coordinate average value corresponding to the first target voxel and the second coordinate average value, and then combine the second covariance matrix corresponding to the first target voxel with the second average value difference matrix, that is, offset the second covariance average value through the second average value difference matrix to obtain a second offset matrix corresponding to the first target voxel, and the electronic device may multiply the first offset matrix by the first weight to obtain a first weighted matrix, multiply the second offset matrix by the second weight to obtain a second weighted matrix, and then divide the sum of the first weighted matrix and the second weighted matrix by the sum of the first weight and the second weight to obtain the target covariance matrix. As shown in Formula (5), Formula (5) represents the computing process of the target covariance matrix, $$\sum = \frac{m\left(\sum_m + (\vec{\mu}_m - \vec{\mu})(\vec{\mu}_m - \vec{\mu})^T\right) + n\left(\sum_n + (\vec{\mu}_n - \vec{\mu})(\vec{\mu}_n - \vec{\mu})^T\right)}{m+n}$$

Formula (5)

It should be noted that $(\vec{\mu}_m - \vec{\mu})(\vec{\mu}_m - \vec{\mu})^T$ may represent difference matrix, $\Sigma_m + (\vec{\mu}_m - \vec{\mu})(\vec{\mu}_m - \vec{\mu})^T$ may represent the first offset matrix, $(\vec{\mu}_n - \vec{\mu})(\vec{\mu}^n - \vec{\mu})^T$ may represent the second average value difference matrix, $\Sigma_n + (\vec{\mu}_n - \vec{\mu})(\vec{\mu}_n - \vec{\mu})^T$ represents the second offset matrix, and $\Sigma$ represents the target covariance matrix.

Step 360, updating the point cloud probability distribution corresponding to the first target voxel according to the target probability distribution parameter value to obtain the target map.

The electronic device may substitute the target probability distribution parameter value into the distribution formula of the distribution type corresponding to the first target voxel to obtain the updated point cloud probability distribution corresponding to the first target voxel, to obtain the target map. Optionally, the distribution type corresponding to the first target voxel may also be Gaussian distribution, and a distribution formula of the Gaussian distribution is not described herein, and may be obtained with reference to the related arts.

In the embodiment of the present application, the electronic device may further perform coordinate conversion on each point cloud coordinate point respectively based on the collection pose corresponding to each point cloud coordinate point, to obtain first map coordinate points in the prior map corresponding to the point cloud coordinate points, and may determine a target voxel to which each first map coordinate point belongs, as a target voxel corresponding to each point cloud coordinate point in the prior map, and determine a space range that needs to be updated in the prior map, to accurately update the prior map, and improve map updating efficiency. The electronic device then computes the first probability distribution parameter value corresponding to the first target voxel according to the first map coordinate point included in the first target voxel, and fuses the first probability distribution parameter value and the second probability distribution parameter value included in the point cloud distribution corresponding to the first target voxel to obtain the target probability distribution parameter value, and finally determines the updated point cloud probability distribution corresponding to the first target voxel according to the target probability distribution parameter value to obtain the target map. Not every one of the map coordinate points of the first target voxel needs to be computed, and the first probability distribution parameter value is simply computed according to the first map coordinate points, and the first probability distribution parameter value and the second probability distribution parameter value are fused, to obtain the target probability distribution parameter value, which improves computing efficiency of the probability distribution parameter value, thereby further improving map updating efficiency.

Figure 4:
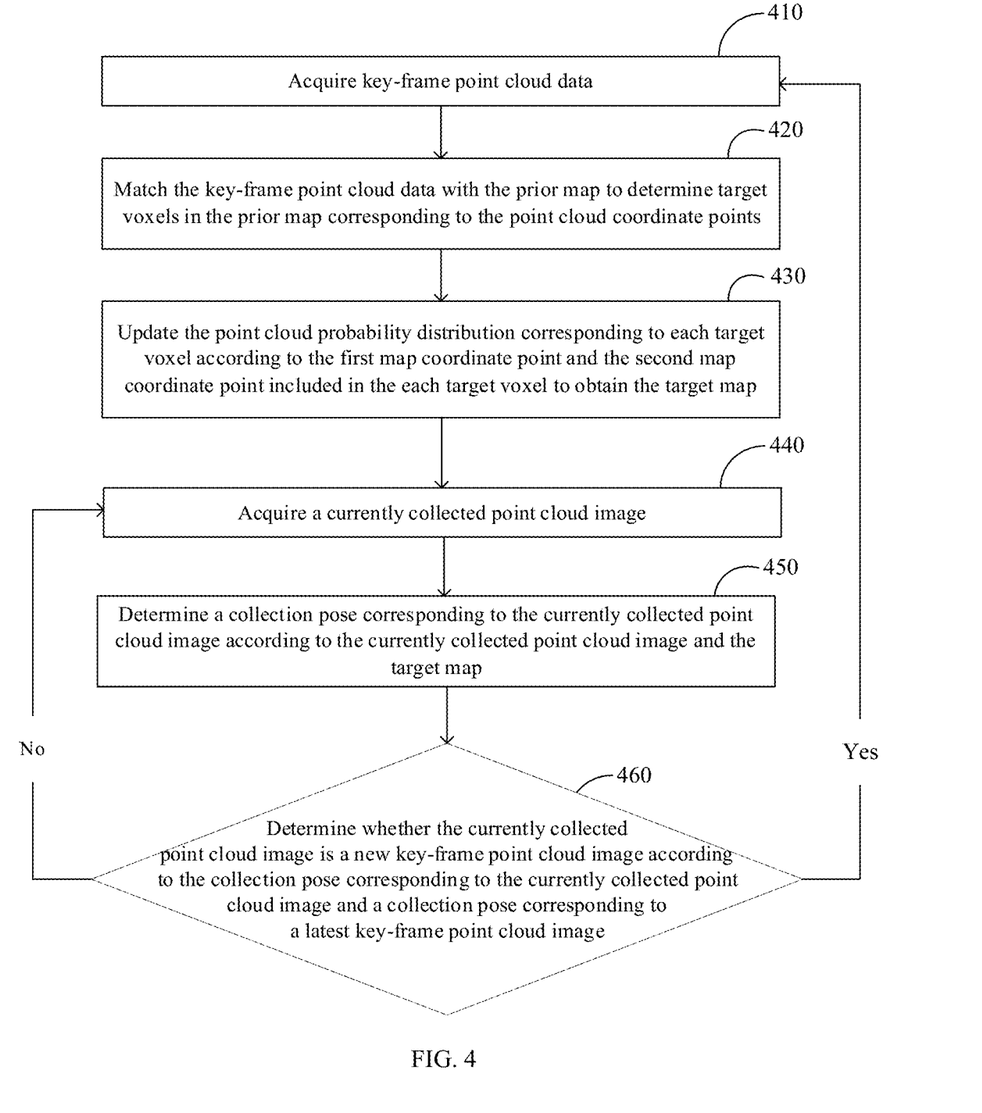
FIG. 4 is a schematic flowchart of another local map updating method according to an embodiment of the present application.

As shown in FIG. 4, FIG. 4 is a schematic flowchart of another local map updating method according to an embodiment of the present application, the local map updating method may be applied to the electronic device in the above embodiment, and the local map updating method may include the following steps:

Step 410: acquiring key-frame point cloud data.

It may be understood that the electronic device may collect a plurality of key-frame point cloud images in a moving process, to make map updating more accurate, optionally, the electronic device may also select, based on the plurality of key-frame point cloud images, most recently collected key-frame point cloud images with a preset proportion as the key-frame point cloud data. For example, the electronic device can select the most recently collected key-frame point cloud images which is half of the plurality of key-frame point cloud images and take them as the key-frame point cloud data. Optionally, the electronic device may determine, based on the point cloud number of the key-frame point cloud images, a target number corresponding to the point cloud number, to obtain key-frame point cloud images of the target number of frames as the key-frame point cloud data.

In an embodiment, the electronic device may determine whether a number of currently collected key-frame point cloud images is less than N, where N is a positive integer, and if the number of currently collected key-frame point cloud images is greater than or equal to N, the electronic device may obtain the first N key-frame point cloud images ordered from latest to earliest according to collection time of the key-frame point cloud images, and obtain the key-frame point cloud data based on point cloud coordinate points included in the first N key-frame point cloud images; or if the number of currently collected key-frame point cloud images is less than N, the electronic device may obtain the currently collected key-frame point cloud images, and obtain the key-frame point cloud data based on point cloud coordinate points included in the currently collected key-frame point cloud images.

In this embodiment, when the number of key-frame point cloud images is greater than or equal to N, the electronic device may arrange the key-frame point cloud images according to the collection time, so as to obtain the first N key-frame point cloud images ordered in from latest to earliest, thereby improving the accuracy of map updating; and when the number of key-frame point cloud images is less than N, all key-frame images are obtained, so as to avoid the error caused by insufficient number, thereby improving the applicability of the local map updating method.

Step 420, matching the key-frame point cloud data with the prior map to determine target voxels in the prior map corresponding to the point cloud coordinate points.

Step 430, updating the point cloud probability distribution corresponding to each target voxel according to the first map coordinate point and the second map coordinate point included in the each target voxel to obtain the target map.

Step 440, acquiring a currently collected point cloud image.

Step 450, determining a collection pose corresponding to the currently collected point cloud image according to the currently collected point cloud image and the target map.

After determining the target map, when acquiring the currently collected point cloud image, the electronic device may determine, based on the currently collected point cloud image and the target map by using the NDT algorithm, a transformation parameter value corresponding to the currently collected point cloud image, where the transformation parameter value may minimize a sum of posterior errors in the voxels of the prior map after the currently collected point cloud image is transformed, and the electronic device may determine, based on the transformation parameter value, a collection pose corresponding to the currently collected point cloud image, which is then determined as the collection pose of the currently collected point cloud image to reduce the transformation process and improve efficiency of pose determining.

It may be understood that, since the target map is dynamically and locally updated in the moving process of the electronic device, the target map may always match the dynamic environment to a specific degree, and the electronic device determines the collection pose by using the target map, thereby improving accuracy of pose determination.

Step 460, determining whether the currently collected point cloud image is a new key-frame point cloud image according to the collection pose corresponding to the currently collected point cloud image and a collection pose corresponding to a latest key-frame point cloud image.

In a case that the currently collected point cloud image is the new key-frame point cloud image, steps 410-460 are performed again. In a case that the currently collected point cloud image is not the new key-frame point cloud image, steps 440-460 are performed again.

In an embodiment, the electronic device may compute a pose difference between the collection pose corresponding to the currently collected point cloud image and the collection pose corresponding to the latest key-frame point cloud image, and the electronic device may determine whether the pose difference is greater than a difference threshold, and if the pose difference is greater than the difference threshold, the currently collected point cloud image is determined as a new key-frame point cloud image, or if the pose difference is less than or equal to the difference threshold, the currently collected point cloud image is not determined as a new key-frame point cloud image. By implementing the embodiment, the accuracy of the determined key-frame point cloud image can be improved, and overhigh similarity of each key-frame point cloud image can be avoided, thereby improving the accuracy and efficiency of map updating.

The pose difference may include a position distance and a rotation angle, the difference threshold may include a preset distance threshold and a preset angle threshold, the electronic device may determine whether the position distance is greater than the preset distance threshold and whether the rotation angle is greater than the preset angle threshold, and if the position distance is greater than the preset distance or the rotation angle is greater than the preset angle, the currently acquired point cloud image is determined as the new key-frame point cloud image, and if the position distance is less than or equal to the preset distance and the rotation angle is less than or equal to the preset angle, the currently acquired point cloud image is not determined as the new key-frame point cloud image.

Specifically, the collection pose corresponding to the currently acquired point cloud image may be $[R_1, t_1]$, where $R_1$ represents a first angle vector, $t_1$ represents a first position vector, and the collection pose corresponding to the latest key-frame point cloud image may be $[R_2, t_2]$, where $R_2$ represents a second angle vector, $t_2$ represents a second position vector, the electronic device may subtract the second position vector from the first position vector to obtain a position distance, as shown in Formula (6), the electronic device may multiply a transpose vector of the first angle vector by the second angle vector to obtain a rotation, as shown in Formula (7), in order to be applicable to more scenarios, such as a scenario with a non-plane slope, since the rotation is a rotation matrix, and the matrix is relatively complex, the electronic device may convert the rotation to obtain a rotation angle dR, and then compare the rotation angle with a preset angle threshold, where the rotation angle may refer to an axis angle representing an angle that needs to be rotated around a coordinate axis of the map coordinate system. A conversion manner from rotation matrix to axis angle is not limited in the embodiment of the present application.

$$dt = \|t_1 - t_2\|; \quad \text{Formula (6)}$$

$$dR = R_1^T R_2; \quad \text{Formula (7)}$$

where dt represents the position distance, and dR represents the rotation angle. As an example, the preset distance may be 1 meter, the preset angle may be 5 degrees, and the electronic device may determine whether dt is greater than 1 meter and whether dR is greater than 5 degrees.

It should be understood that a first one of the key-frame point cloud images may be determined by using a specific manner, which is not limited in the embodiment of the present application.

In the embodiment of the present application, the electronic device may further obtain at least one frame of recently collected key-frame point cloud image, and obtain the key-frame point cloud data based on the point cloud coordinate points included in each frame of key-frame point cloud image; after obtaining the target map, the electronic device may determine, based on the currently collected point cloud image and the target map, a collection pose corresponding to the currently collected point cloud image, and then determine, based on the collection pose corresponding to the currently collected point cloud image and the collection pose corresponding to the most recent frame of key-frame point cloud image, whether to determine the currently collected point cloud image as a new key-frame point cloud image, and when the currently collected point cloud image is to be determined as a new key-frame point cloud image, re-determine the key-frame point cloud data, to perform local map updating again; and keep updating the map in a moving process of the electronic device, so that the target map currently used for registration better matches a current environment, thereby improving accuracy of the determined collection pose, and each updating of the map is local updating based on an initial prior map, which avoids total deviation of the target map from the prior map, and improves accuracy of target map.

Figure 5:
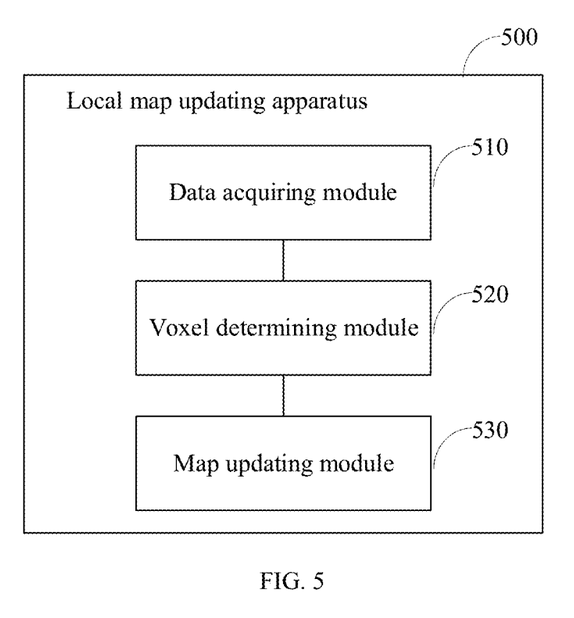
FIG. 5 is a schematic diagram of modules of a local map updating apparatus according to an embodiment of the present application.

As shown in FIG. 5, FIG. 5 is a schematic diagram of modules of a local map updating apparatus according to an embodiment of the present application, and the local map updating apparatus 500 may include a data acquiring module 510, a voxel determining module 520, and a map updating module 530.

The data acquiring module 510 is configured to acquire key-frame point cloud data, where the key-frame point cloud data includes point cloud coordinate points.

The voxel determining module 520 is configured to match the key-frame point cloud data with a prior map to determine target voxels in the prior map corresponding to the point cloud coordinate points, where the prior map includes voxels and a point cloud probability distribution corresponding to each voxel.

The map updating module 530 is configured to update, according to a first map coordinate point and a second map coordinate point that are included in each target voxel, a point cloud probability distribution corresponding to each target voxel, to obtain a target map, where the first map coordinate point is obtained by converting the point cloud coordinate point corresponding to the target voxel, and the second map coordinate point is a coordinate point included in the target voxel in the prior map.

In the embodiment of the present application, the key-frame point cloud data including the point cloud coordinate points is obtained, the key-frame point cloud data is matched with the prior map, to determine the target voxels corresponding to the point cloud coordinate points from the voxels included in the prior map, each target voxel may include a first map coordinate point and a second map coordinate point, the first map coordinate point is obtained by converting the point cloud coordinate point corresponding to the target voxel, and the second map coordinate point is a coordinate point included in the target voxel in the prior map, and then the point cloud probability distribution corresponding to each target voxel is updated according to the first map coordinate point and the second map coordinate point included in each target voxel, to obtain the target map. When the embodiment is implemented, the key-frame point cloud data is acquired, the to-be-updated target voxels, in the prior map, corresponding to the point cloud coordinate points included in the key-frame point cloud data are determined, and then the point cloud probability distribution corresponding to each target voxel is updated according to the first map coordinate point and the second map coordinate point that correspond to each target voxel, so that the prior map is locally updated without global updating of the prior map, consumption of computing resources for map updating is reduced, and map updating efficiency is improved. Furthermore, since the updating is performed based on the prior map, the fixed features of the prior map can be retained, avoiding the fixed features of the prior map from being incorrectly covered, improving the accuracy of the map updating, making the target image match the changing environment more closely, and the device pose is determined by the target map, which can also improve the accuracy of the determined device pose.

Figure 6:
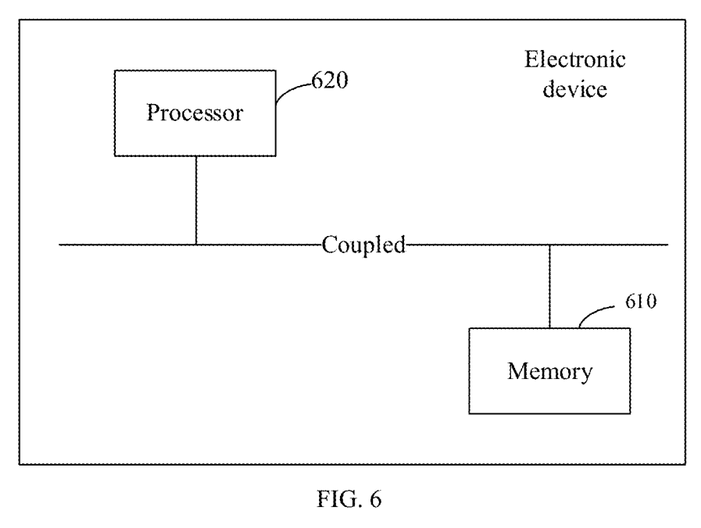
FIG. 6 is a structural block diagram of an electronic device according to an embodiment of the present application.

As shown in FIG. 6, in an embodiment, an electronic device is provided, including:

a memory 610 storing an executable program code; and
a processor 620 coupled with the memory 610;
the processor 620 calls the executable program code stored in the memory 610, to implement the local map updating method provided in the above embodiments.

The memory 610 may include a random access memory (Random Access Memory, RAM), or may include a read-only memory (Read-Only Memory, ROM). The memory 610 may be configured to store instructions, programs, codes, code sets, or instruction sets. The memory 610 may include a program storage area and a data storage area, where the program storage area may store instructions for implementing an operating system, instructions for implementing at least one function (for example, a touch function, a sound playing function, and an image playing function), and instructions for implementing the above method embodiments. The data storage area may further store data created by the electronic device in use, and the like.

The processor 620 may include one or more processing cores. The processor 620 connects various parts in the entire electronic device by using various interfaces and lines, and performs various functions of the electronic device and processes data by running or executing instructions, programs, code sets, or instruction sets stored in the memory 610 and invoking data stored in the memory 610. Optionally, the processor 620 may be implemented in at least one hardware form of a digital signal processing (DSP), a field-programmable gate array (FPGA), or a programmable logic array (PLA). The processor 620 may be integrated into one or a combination of a central processing unit (CPU), a graphics processing unit (GPU), a modem, and the like. The CPU mainly processes an operating system, a user interface, an application program, and the like; the GPU is configured to render and draw display content; and the modem is configured to process wireless communication. It can be understood that the modem may also not be integrated into the processor 620, and is implemented by a communication chip alone.

It may be understood that the electronic device may include more or fewer structural elements than those in the above structural block diagram, for example, include a power module, a physical button, a wireless fidelity (WiFi) module, a speaker, a Bluetooth module, or a sensor, or may not be limited herein.

An embodiment of the present application discloses a computer-readable storage medium, storing a computer program, where the computer program enables a computer to perform the method described in the above embodiments.

In addition, an embodiment of the present application further discloses a computer program product, and when the computer program product is running on a computer, the computer is enabled to perform all or some of the steps in any local map updating method described in the above embodiments.

A person of ordinary skill in the art may understand that all or some steps in the methods in the above embodiments may be completed by instructing related hardware by using a program, and the program may be stored in a computer-readable storage medium, where the storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory (EEPROM), a compact disc read-only memory (Compact Disc Read-Only Memory, CD-ROM) or another optical disc memory, a magnetic disk memory, a magnetic tape memory, or any other medium that can be used to carry or store data and that is readable by a computer.

The local map updating method and apparatus, and the electronic device in the embodiments of the present application are described in detail above, specific examples are used herein to describe the principles and implementations of the present application, and the description of the above embodiments is only used to help understand the method and core idea of the present application; meanwhile, for those skilled in the art, according to the idea of the present application, there will be changes in the specific implementations and application scope, and in summary, the content of the present specification should not be construed as limiting the present application.

What is claimed is:

1. A local map updating method, performed by an intelligent robot, wherein the intelligent robot comprises a point cloud collector, a processor and a memory, and the method comprises:

acquiring, by the point cloud collector, key-frame point cloud data, wherein the key-frame point cloud data comprises point cloud coordinate points;

matching, by the processor, the key-frame point cloud data with a prior map stored in the memory to determine target voxels, in the prior map, corresponding to the point cloud coordinate points; wherein the prior map comprises voxels and a respective point cloud probability distribution corresponding to each of the voxels; each of the target voxels comprises a first map coordinate point and a second map coordinate point, wherein the first map coordinate point is obtained by converting the point cloud coordinate point corresponding to the target voxel, and the second map coordinate point is a coordinate point comprised in the target voxel in the prior map;

computing, by the processor, a first probability distribution parameter value corresponding to a first target voxel according to the first map coordinate point comprised in the first target voxel, wherein the first target voxel is any one of the target voxels;

fusing, by the processor, the first probability distribution parameter value with a second probability distribution parameter value comprised in the point cloud probability distribution corresponding to the first target voxel, to obtain a target probability distribution parameter value, wherein the second probability distribution parameter value is obtained based on the second map coordinate point comprised in the first target voxel;

updating, by the processor, the point cloud probability distribution corresponding to the first target voxel according to the target probability distribution parameter value; and positioning, by the processor, the intelligent robot based on the updated point cloud probability distribution.

2. The method according to claim 1, wherein matching the key-frame point cloud data with the prior map stored in the memory to determine the target voxels, in the prior map, corresponding to the point cloud coordinate points comprises:

performing coordinate transformation on each of the point cloud coordinate points respectively according to a collection pose corresponding to the each of the point cloud coordinate points, to obtain the first map coordinate points, in the prior map, corresponding to the point cloud coordinate points; and determining the target voxels to which the first map coordinate points belong.

3. The method according to claim 1, wherein the first probability distribution parameter value comprises a first coordinate average value and a first covariance matrix, the second probability distribution parameter value comprises a second coordinate average value and a second covariance matrix, and the target probability distribution parameter value comprises a target coordinate average value and a target covariance matrix; and fusing the first probability distribution parameter value with the second probability distribution parameter value comprised in the point cloud probability distribution corresponding to the first target voxel, to obtain the target probability distribution parameter value comprises:

performing weighted average computing on the first coordinate average value and the second coordinate average value to obtain the target coordinate average value;

offsetting the first covariance matrix according to the target coordinate average value and the first coordinate average value to obtain a first offset matrix;

offsetting the second covariance matrix according to the target coordinate average value and the second coordinate average value to obtain a second offset matrix; and performing weighted average computing on the first offset matrix and the second offset matrix to obtain the target covariance matrix.

4. The method according to claim 1, wherein acquiring the key-frame point cloud data comprises:

when a number of currently collected key-frame point cloud images is greater than or equal to N, obtaining first N key-frame point cloud images ordered from latest to earliest according to collection time of the key-frame point cloud images, wherein N is a positive integer; and obtaining the key-frame point cloud data according to the point cloud coordinate points comprised in the first N key-frame point cloud images.

5. The method according to claim 1, wherein acquiring the key-frame point cloud data comprises:

when a number of currently collected key-frame point cloud images is less than N, obtaining the currently collected key-frame point cloud images, wherein N is a positive integer;

obtaining the key-frame point cloud data according to the point cloud coordinate points comprised in the currently collected key-frame point cloud images.

6. The method according to claim 1, wherein after updating the point cloud probability distribution corresponding to each of the target voxels according to the first map coordinate point and the second map coordinate point comprised in the each of the target voxel to obtain the target map, the method further comprises:

determining a collection pose corresponding to a currently collected point cloud image according to the currently collected point cloud image and the target map;

determining whether the currently collected point cloud image is a new key-frame point cloud image according to the collection pose corresponding to the currently collected point cloud image and a collection pose corresponding to a latest key-frame point cloud image; and in response to determining that the currently collected point cloud image is the new key-frame point cloud image, returning to the step of acquiring the key-frame point cloud data.

7. The method according to claim 6, wherein determining whether the currently collected point cloud image is the new key-frame point cloud image according to the collection pose corresponding to the currently collected point cloud image and the collection pose corresponding to the latest key-frame point cloud image comprises:

computing a pose difference between the collection pose corresponding to the currently acquired point cloud image and the collection pose corresponding to the latest key-frame point cloud image;

in response to determining that the pose difference is greater than a difference threshold, determining that the currently collected point cloud image is the new key-frame point cloud image; and in response to determining that the pose difference is less than or equal to the difference threshold, determining that the currently collected point cloud image is not the new key-frame point cloud image.

8. The method according to claim 1, wherein the point cloud coordinate points are determined based on a point cloud coordinate system, and the first map coordinate point and the second map coordinate point are determined based on a map coordinate system.

9. The method according to claim 8, wherein for each of the point cloud coordinate points, a collection pose corresponding to the point cloud coordinate point represents a conversion relationship between the point cloud coordinate system corresponding to the point cloud coordinate point and the map coordinate system corresponding to the first map coordinate point and the second map coordinate point.

10. The method according to claim 8, wherein performing coordinate transformation on each of the point cloud coordinate points respectively according to the collection pose corresponding to the each of the point cloud coordinate points, to obtain the first map coordinate points, in the prior map, corresponding to the point cloud coordinate points comprises:

for each of the point cloud coordinate points, determining a conversion parameter value corresponding to the point cloud coordinate point according to the collection pose corresponding to the point cloud coordinate point, wherein the conversion parameter value comprises a rotation vector and a translation vector; and performing coordinate transformation on the point cloud coordinate point according to the conversion parameter value, to obtain the first map coordinate point, in the prior map, corresponding to the point cloud coordinate point.

11. The method according to claim 6, wherein the point cloud image is collected by a point cloud collection apparatus, and the point cloud collection apparatus comprises a 3D laser sensor or a depth camera.

12. The method according to claim 11, wherein the collection pose comprises a collection position or a collection posture, or both, wherein the collection position comprises a position of the point cloud collection apparatus relative to a coordinate origin of a map coordinate system of the prior map, and the collection posture comprises an angle between a line connecting the collection position and the coordinate origin of the map coordinate system and a direction of each coordinate axis of the map coordinate system.

13. The method according to claim 1, wherein the prior map is pre-constructed, a number of the voxels comprised in the prior map is a product of numbers of segmentations respectively corresponding to three spatial dimensions, and the number of segmentations is determined according to a spatial range corresponding to the prior map.

14. The method according to claim 1, wherein the first probability distribution parameter value represents a probability that the first map coordinate point exists at any position in the first target voxel, and the second probability distribution parameter value represents a probability that the second map coordinate point exists at any position in the first target voxel.

15. The method according to claim 1, wherein a distribution type corresponding to the first map coordinate points comprised in the first target voxel is Gaussian distribution, and a distribution type corresponding to the second map coordinate points comprised in the first target voxel is Gaussian distribution.

16. The method according to claim 1, wherein fusing the first probability distribution parameter value with the second probability distribution parameter value comprised in the point cloud probability distribution corresponding to the first target voxel, to obtain the target probability distribution parameter value comprises:
    fusing, according to a first weight corresponding to the first probability distribution parameter value and a second weight corresponding to the second probability distribution parameter value, the first probability distribution parameter value with the second probability distribution parameter value comprised in the point cloud probability distribution corresponding to the first target voxel, to obtain the target probability distribution parameter value.

17. The method according to claim 16, wherein the method further comprises:
    determining the first weight according to a number of the first map coordinate points comprised in the first target voxel; and
    determining the second weight according to a number of the second map coordinate points comprised in the first target voxel.

18. The method according to claim 17, wherein the first weight is a proportion of the first map coordinate points comprised in the first target voxel in all map coordinate points comprised in the first target voxel, and the second weight is a proportion of the second map coordinate points comprised in the first target voxel in all map coordinate points comprised in the first target voxel.

19. The method according to claim 2, wherein determining the target voxels to which the first map coordinate points belong comprises:
    determining the target voxels to which the first map coordinate points belong according to a spatial range corresponding to the voxels comprised in the prior map.

20. An intelligent robot, comprising:
    a memory storing an executable program code;
    a processor coupled with the memory; and
    a point cloud collector;
    wherein when the processor executes the executable program code stored in the memory, the method according to claim 1 is implemented.

* * * * *